United States Patent [19]
Liu

[11] Patent Number: 5,742,041
[45] Date of Patent: Apr. 21, 1998

[54] METHOD AND APPARATUS FOR LOCATING AND DECODING MACHINE-READABLE SYMBOLS, INCLUDING DATA MATRIX SYMBOLS

[75] Inventor: Lingnan Liu, Lynnwood, Wash.

[73] Assignee: Intermec Corporation, Everett, Wash.

[21] Appl. No.: 654,925

[22] Filed: May 29, 1996

[51] Int. Cl.$^6$ .................................................. G06K 7/10
[52] U.S. Cl. ............................................ 235/462; 235/463
[58] Field of Search ................................ 235/462, 463

[56] References Cited

U.S. PATENT DOCUMENTS

| | | | |
|---|---|---|---|
| 2,612,994 | 10/1952 | Woodland et al. | 209/111 |
| 4,013,893 | 3/1977 | Hertig | 250/568 |
| 4,687,942 | 8/1987 | Takagi et al. | 250/556 |
| 4,874,936 | 10/1989 | Chandler | 235/494 |
| 4,916,298 | 4/1990 | Raphaël | 235/463 |
| 4,998,010 | 3/1991 | Chandler et al. | 235/494 |
| 5,080,456 | 1/1992 | Katz et al. | 359/214 |
| 5,155,343 | 10/1992 | Chandler et al. | 235/462 |
| 5,189,292 | 2/1993 | Batterman et al. | 235/494 |
| 5,241,166 | 8/1993 | Chandler | 235/494 |
| 5,276,315 | 1/1994 | Surka | 235/462 |
| 5,319,181 | 6/1994 | Shellhammer et al. | 235/462 |
| 5,324,923 | 6/1994 | Cymbalski et al. | 235/454 |
| 5,373,147 | 12/1994 | Noda | 235/462 |
| 5,376,780 | 12/1994 | Klueter | 235/462 |

OTHER PUBLICATIONS

*About Aztec Code Rev. 2.0*, Welch Allyn, Inc. Data Collection Division, Skaneateles Falls, New York, Jul. 7, 1995, pp. 1–7, plus drawing.

*Uniform Symbology Specification–MaxiCode*, AIM USA Technical Specification, Pittsburgh, Pennsylvania, May 19, 1995, Draft, pp. 1–39.

*Data Matrix*, AIM USA Technical Specification, Pittsburgh, Pennsylvania, May 18, 1995, Draft, pp. 1–89.

Russ, John C., *The Image Processing Handbook*, CRC Press, Boca Raton, Florida, Nov., 1994, pp. 170–189.

*Uniform Symbology Specification Code One*, AIM USA Technical Specification, Pittsburgh, Pennsylvania, Jul., 1994, pp. 1–32.

Pavlidis, Theo, et al., "Information Encoding with Two–Dimensional Bar Codes," *Computer*, Jun. 1992, pp. 18–28.

Palmer, Roger C., *The Bar Code Book*, 2d ed., Helmers Publishing, Inc., New Hampshire, 1991, pp. 19–20, 61–62, 90–95, 137–148.

Davies, E.R., *Machine Vision: Theory, Algorithms, Practicalities*, Academic Press, London, 1989, pp. 206–215 and 265–271.

Ackley, Sprague, "Verification—New Insight for An Old Debate," *Scan–Tech '87*, Oct. 13, 1987, pp. 1–17.

Gonzalez, Rafael C. and Paul Wintz, *Digital Image Processing*, Addison–Wesley Publishing Company, Reading, Massachusetts, 1977, pp. 36–47.

*Primary Examiner*—Harold Pitts
*Attorney, Agent, or Firm*—Seed and Berry LLP

[57] ABSTRACT

A method and apparatus for locating and decoding machine-readable symbols such as Data Matrix symbols begins by storing an image of the symbol. The invention locates an edge point between the quiet zone and a solid boundary of the finder pattern for the symbol. Therefrom, the present invention locates at least portions of first and second solid boundaries, and preferably a solid corner therebetween. Thereafter, the present invention locates at least portions of dashed boundaries extending from the free ends of the solid boundaries. After locating the solid and dashed boundaries of the finder pattern for the symbol, the present invention determines the periphery and version of the symbol, and then applies the appropriate decode routine to decode the image of the symbol.

32 Claims, 9 Drawing Sheets

METHOD AND APPARATUS FOR LOCATING AND DECODING MACHINE-READABLE SYMBOLS, INCLUDING DATA MATRIX SYMBOLS

TECHNICAL FIELD

The present invention relates to methods and apparatus for locating and decoding machine-readable symbols or images, including, symbols having at least two solid borders.

BACKGROUND OF THE INVENTION

Bar code readers locate and decode typical bar codes from linear symbologies. "Linear symbologies" are symbologies where data is encoded as parallel arrangements of alternating, multiple-width bars and spaces (e.g., U.P.C., Code 39, Code 93, etc.). Linear symbologies, as well as other symbologies, encode "data characters" (i.e., human-readable characters) as "symbol characters," which are typically alternating bars and spaces.

Bar code readers typically convert symbol characters to data characters by scanning or imaging an area to produce a reflectance signal that is generally an analog signal representing the modulated light reflected from areas of high reflectance or "spaces," and absorbed by areas of low reflectance or "bars." As a result, the signal represents the pattern of bars and spaces in the symbol.

Bar code readers typically locate bar code information from other visual noise represented in the signal by locating in the signal a quiet zone. A "quiet zone" is a clear space, containing no dark marks, that precedes or follows a symbol, often next to a start or stop character. Typically, a quiet zone has a size that is about ten times greater than bars that precede or follow the quiet zone.

Newer data collection symbologies have departed from the typical linear symbologies to create stacked or area symbologies in order to increase "information density," i.e., the amount of information encoded within a given area. "Stacked symbologies," or multi-row symbologies, employ several adjacent rows of multiple-width bars and spaces (e.g., Code 49, PDF417, etc.). "Area symbologies" or two-dimensional matrix symbologies, employ arrangements of regular polygon-shaped data cells where the center-to-center distance of adjacent data cells is uniform (e.g., Data Matrix, MaxiCode, Code One, Aztec Code, etc.).

While standard locating and decode algorithms can be used for linear symbologies, and for some stacked symbologies, such algorithms are unsuitable for area symbologies. Area symbologies typically employ "finder patterns" that are unique patterns capable of being recognized by automated image recognition equipment and algorithms. For example, the Data Matrix symbology employs a two-dimensional matrix of adjacent square modules with a finder pattern that includes solid edges or boundaries along the bottom and left sides, and two dashed boundaries along the top and right sides consisting of alternating black and white squares.

The Data Matrix symbology employs a method of finding and decoding a symbol within a stored image. The standard method includes the steps of: (1) searching for a location of the symbol within the stored image; (2) finding the two solid boundaries of the finder pattern; (3) finding the outside boundary of the dashed boundaries; (4) trimming any white "peninsulas" on the outside boundary of the two solid boundaries; (5) locating the two dashed boundaries; (6) calculating the local average module width, C, using the two dashed boundaries; (7) determining the centers of the black and white square modules on the dashed boundaries; and (8) determining the centers of the data modules for small symbols (i.e., without internal finder patterns) and decoding the symbol. The steps are performed sequentially, where the entire solid and dashed boundaries are first located, and thereafter additional locating steps performed. For larger symbols having internal finder patterns, the method further includes the steps of: (1) finding the center points of the dashed boundaries for the internal finder patterns; (2) determining the centers of the data modules; (3) determining if the number of data modules is even, and if so, decoding the symbol using an ECC 200 decode method; and (4) determining if the number of data modules is odd, and if so, decoding the symbol using an ECC 000-140 decode routing. More detail regarding the method can be found in the Data Matrix AIM Uniform Symbology Specification.

The above method requires a substantial amount of memory capacity during the locating process for a given symbol, and requires a significant amount of processing overhead, often requiring a fast microprocessor. Fast microprocessors are typically more expensive than their slower counterparts, and therefore, readers designed to locate and decode Data Matrix symbols are expensive. Possibly more importantly, since the finder pattern is located on only two sides of the matrix of data cells, adjacent to the quiet zone, and is relatively narrow, the standard locating algorithm cannot always locate the finder pattern. Data Matrix symbols are even more difficult to locate if the symbol is distorted or defective. If the stored image suffers from perspective angle distortion (e.g., when the image is created with the reader not perpendicular to the symbol), or the label is damaged along its finder pattern boundaries, the standard method for decoding Data Matrix symbols is inadequate.

SUMMARY OF THE INVENTION

The present invention embodies a method and apparatus for locating and decoding machine-readable symbols, including Data Matrix symbols, by identifying portions of the finder pattern and then constructing a boundary for the stored image of the symbol. The present invention provides a robust method of locating images of symbols by employing redundant information in the finder pattern, such as the relative large finder pattern with respect to the size of the symbol in the Data Matrix symbology. The present invention can locate and define the location of a Data Matrix symbol with only the following information: (1) two opposite corners; (2) three complete boundaries or sides of the finder pattern; (3) four partial boundaries; (4) three partial boundaries and one corner of the missing boundary; or (5) one corner and two partial boundaries facing the one corner. Based on only one of these five cases of identified information, the present invention can accurately estimate the boundary of the symbol and therefrom rapidly decode the symbol.

Additionally, the present invention can determine the version of the symbol. The necessary information for finding the version of a Data Matrix symbol will be either one completed timing track or a complete corner at which the dashed boundaries meet. Two partial dashed boundaries can be helpful to estimate the version, where the accuracy of such estimation depends on how much all of the finder pattern of the symbol are known.

The present invention effectively balances speed in locating and decoding a symbol versus complexity. While a complex routine can be created to locate and attempt to decode very badly distorted or damaged symbols, such a routine would be time-consuming. Consumers desire high-speed symbol readers so that a large quantity of symbols can be rapidly imaged and decoded. Therefore, time-consuming decoding routines are undesirable.

As represented in the claims below, the present invention, in a broad sense, embodies a method of locating a predetermined image within a stored image, the predetermined image having first and second linear features and first and second dashed linear features adjacent to the first and second linear features. The method includes the steps of: (a) locating an edge point of one of the first and second linear features, (b) locating at least a portion of one of the first and second linear features based on the located edge point, (c) locating at least a portion of another of the first and second linear features, (d) locating at least a portion of the first dashed feature based on the located portion of the first or second linear feature, (e) locating the second dashed feature based on the located portion of the first dashed feature or first linear feature, and (f) locating a position of the predetermined image in the stored image based on the located portions of the first and second linear and dashed features.

The present invention also embodies a method of locating an image of a machine-readable symbol within a stored image, the symbol having a predetermined pattern at a periphery of the symbol. The predetermined pattern has first and second solid linear features meeting at a common solid corner, and first and second dashed linear features extending from free ends of the first and second solid features and meeting at a common dashed corner. The method includes the steps of: (a) finding an edge point of the predetermined pattern, (b) analyzing at least a portion of the periphery of the symbol, (c)locating, based on the step of analyzing, at least portions of the predetermined pattern, the located portions being one of: (i) solid and dashed corners, (ii) at least a portion of the first and second solid and dashed features, (iii) at least a portion of the first and second dashed features and the solid corner, (iv) at least a portion of the first and second solid features and the dashed corner, and (v) at least complete locations of three of the four features, and (d) determining a position of the symbol in the stored image based on the located portions of the predetermined pattern.

Other features and associated advantages of the present invention will become apparent from studying the following detailed description, together with the accompanying drawings.

DETAILED DESCRIPTION OF EXEMPLARY EMBODIMENTS OF THE INVENTION

Figure 1:
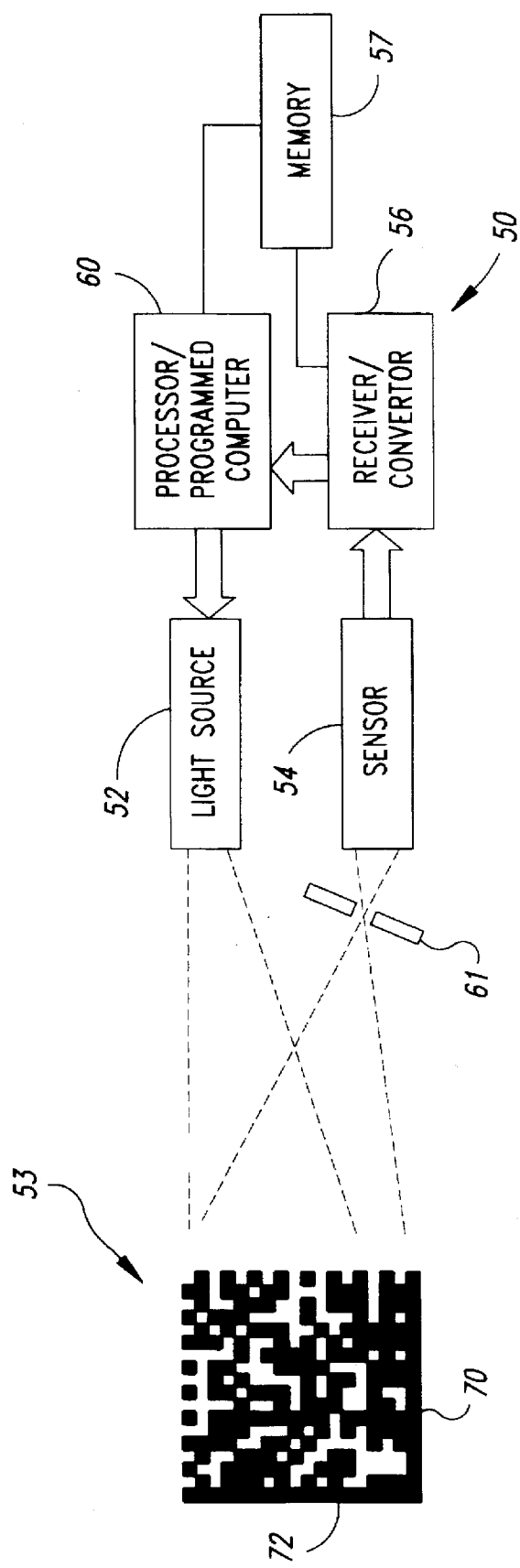
FIG. 1 is a block diagram of an exemplary data collection symbology reader of the present invention with a plan view of a Data Matrix symbol.

As shown in FIG. 1, a data collection symbology reader 50 of the present invention includes a light source 52 that illuminates a data collection or other symbol, such as a Data Matrix symbol 53. As used herein, a "data collection symbol" refers to a symbol from any linear, stacked, area or other machine-readable symbology. A sensor 54 having an optical aperture 61, receives light reflected from the symbol 53 and converts the received light into an electrical signal or profile. For example, the light source 52 can be an LED, flashbulb, infrared light source, rasterizing laser, or other light-emitting element, while the sensor 54 can be a one or two dimensional CCD, semiconductor array, photodetector, vidicon, or other area imager capable of converting received light into electrical signals.

A receiver or converter 56 receives the electrical signal from the sensor 54 and converts into a signal to be processed by a programmed computer or processor 60. Typically, the sensor 54 produces an analog profile signal that represents the modulated light reflected from the elements in the symbol 53. Importantly, if the processor 60 is a digital computer, then the converter 56 converts each pixel in the image of the symbol 53 from an analog signal produced by the sensor 54 to a multi-level digital signal that numerically represents the various amplitudes of the analog signal. The converter 56 and/or processor 60 are coupled to memory 57 for storing the profile in digital form. The converter 56, memory 57 and processor 60 can be monolithically integrated.

The sensor 54 can be a charge-coupled device ("CCD") or similar area imager having a active surface such as a rectangular surface of M by N pixel elements, e.g., 582 by 752 pixel elements. As is known, each pixel element in the CCD array of the sensor typically outputs a gray level signal, i.e., an analog signal that determines the amount or intensity of light impinging upon the particular pixel element, similar to a video data signal. The converter 56 preferably converts the gray level signal into a digital signal having, for example, 16 levels of gray for use by the processor 60. The memory 57 stores the digital signals, and preferably includes both volatile and non-volatile memory (e.g., random access and electrically, erasable read-only memory). As a result the reader 50 allows an object or image within the field of view of the sensor 54 to be converted into electrical signals that are digitized and stored as a stored image in the random access portion memory 57 to be retrieved and processed by the processor 60 under a routine 100 stored in the memory (as described below). After processing the stored image, the processor 60 can output the results of such processing to a peripheral apparatus or a computer (not shown).

Figure 2A:
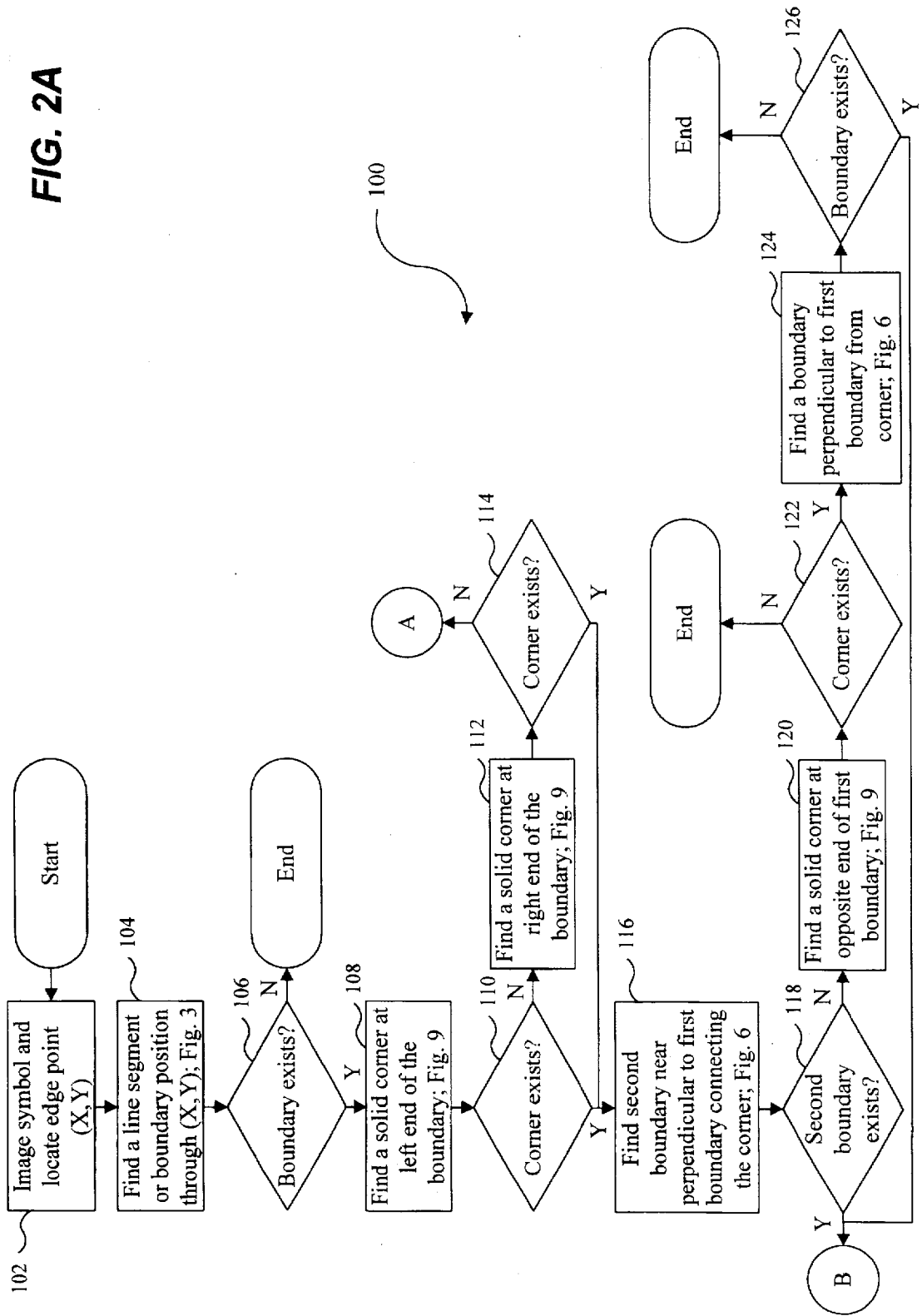
FIGS. 2A and 2B together form a flowchart of an exemplary routine for locating and decoding data collection symbols, particularly the Data Matrix symbol of FIG. 1.
Figure 2B:
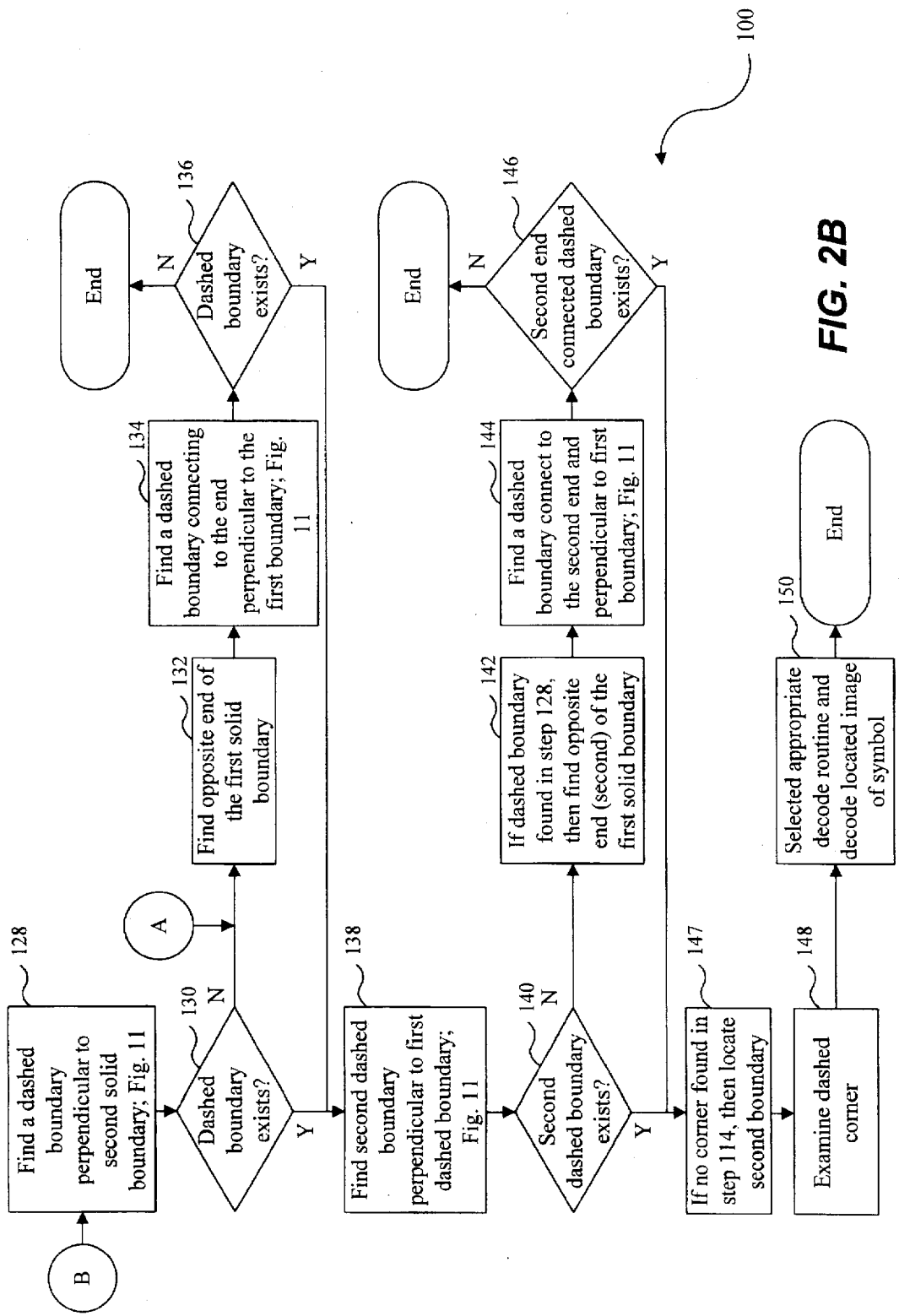

Referring to FIGS. 2A and 2B (FIG. 2 collectively), an exemplary routine 100 performed by the reader 50 of the present invention first locates the image of the symbol 53 within a stored image, and then decodes the symbol. As used herein, the term "stored image" generally refers to the overall image of the field of view stored in the memory 57 that has been produced by the sensor 54 and the processor 60, and which contains the symbol 53 or other symbols to be decoded. For processing efficiency, if the CCD in the sensor 54 has an array of 582 by 752 pixels, then the memory 57 includes a 582 by 752 array of memory locations addressed by the processor 60 that correspond to the array of pixels. The stored image in the memory 57 is preferably referenced by a Cartesian coordinate system so that the location of each pixel is represented by a pair of numbers indicating the horizontal and vertical position of the pixel in the stored image. For example, the first pixel in the top left corner of the stored image is assigned the Cartesian coordinates (0, 0), while the bottom right-most pixel is assigned the coordinates (752, 582). Therefore, objects within the stored image, i.e., groups of pixels, can be arithmetically located using geometric and trigonometric properties based on the coordinate system (e.g., equations of lines, circles, or other geometric or trigonometric equations used for representing planar objects, as described below). As used herein, the term "locates" generally refers to determining both the position and orientation of the image of an object within the stored image.

The routine 100 begins in step 102 where the reader scans or stores an image of the symbol 53. For example, the reader 50 can be a hand-held product and include a trigger switch (not shown) coupled to the processor 60 that causes the light source 52 to illuminate the symbol 53, and allow the sensor 54, converter 56 and processor 60 to store an image of the symbol in the memory 57 upon actuation of the switch. The specific means and method for storing an image of a symbol by the reader 50 are conventional and will be understood by those skilled in the relevant art without need for further description herein.

In step 102, the processor 60 also begins to locate the symbol 53 within the stored image. As shown in FIG. 1, and more clearly in FIG. 3, the Data Matrix symbol 53 includes a finder pattern which consists of two solid boundaries 70 and 72 and two dashed boundaries 74 and 76, a central data region. The two solid boundaries 70 and 72 are ideally positioned 90° from each other and meet at an intersecting corner 80. However, as explained more fully below, optical distortions or defects cause different angles for the solid corner 80, as shown by a symbol 90 in FIG. 4. The first boundary 70 has a free end or corner 82, while the second boundary 72 has a free corner 84.

The two dashed boundaries 74 and 76 meet at a corner 86. If the corner 86 lacks a black square, then the Data Matrix symbol 53 is a version ECC 200 symbol; otherwise, the symbol is a version ECC 140 Data Matrix symbol. The first dashed boundary 74 meets the free end of the second boundary 72 at the corner 84, while the second dashed boundary 76 meets the first boundary 70 at the corner 82.

The ultimate goal of the present invention is to determine the locations of the two solid boundaries 70 and 72 and the two dashed boundaries 74 and 76, and thereby determine a bounding box or outline for the symbol 53. By determining the outline for the symbol 53, the reader 50 can more readily locate each of the data cells within the symbol, and thereby rapidly decode the symbol. The terms "point" and "pixel" are generally used interchangeably herein.

In step 102, the processor 60 begins to locate the symbol 53 within the stored image by, for example, analyzing one or more virtual scan or sampling paths taken through the stored image to locate an edge point between the quiet zone and one of the solid boundaries 70 or 72. The processor 60 locates an edge point (X,Y) in the Cartesian coordinate system, as is well known in the art, such as described in A. Rosenfeld, *Digital Picture Processing,* Academic Press, Vols. 1 and 2, 1982. For example, the processor 60 can analyze multiple sampling paths through the stored image, such as a horizontal path through the image, a vertical path 90° from the horizontal path, and paths 26°, 45° and 71° from the horizontal path. Other known sampling strategies for a stored image can also be employed.

Figure 3:
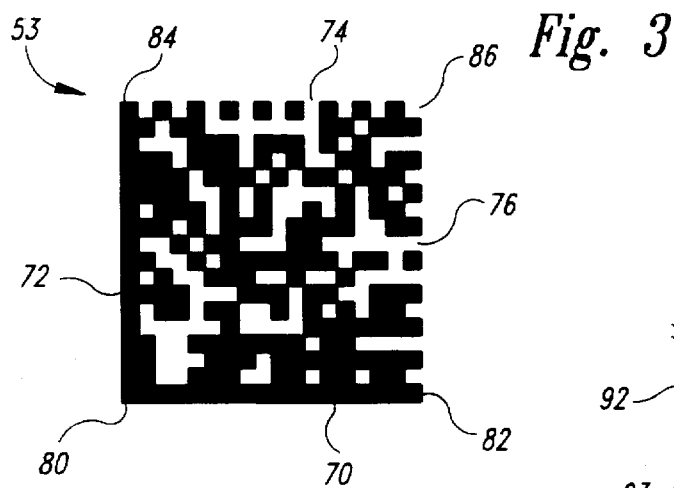
FIG. 3 is an enlarged view of the Data Matrix symbol of FIG. 1.
Figure 4:
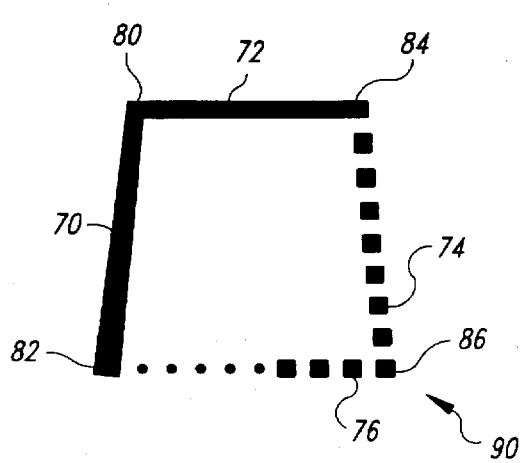
FIG. 4 is a schematic view of an optically distorted Data Matrix symbol.

The initial sampling paths or lines of pixels examined by the processor 60 in step 102 are preferably vertical, so as to locate an edge point for an edge running left to right with respect to the Cartesian coordinate system. The processor 60 initially presumes that a user employing the reader 50 has aligned the sensor 54 upright with respect to the symbol 53 so that the image of the symbol 53 is correctly oriented as shown in FIG. 3. However, the image of the symbol could be oriented at various other orientations within the stored image, such as the inverted symbol 90 shown in FIG. 4. Therefore, the edge point (X,Y) located by the processor 60 in step 102 will likely be along the second solid boundary 72 for the symbol 90, rather than along the first solid boundary 70 for the symbol 53 (FIG. 3).

Figure 5:
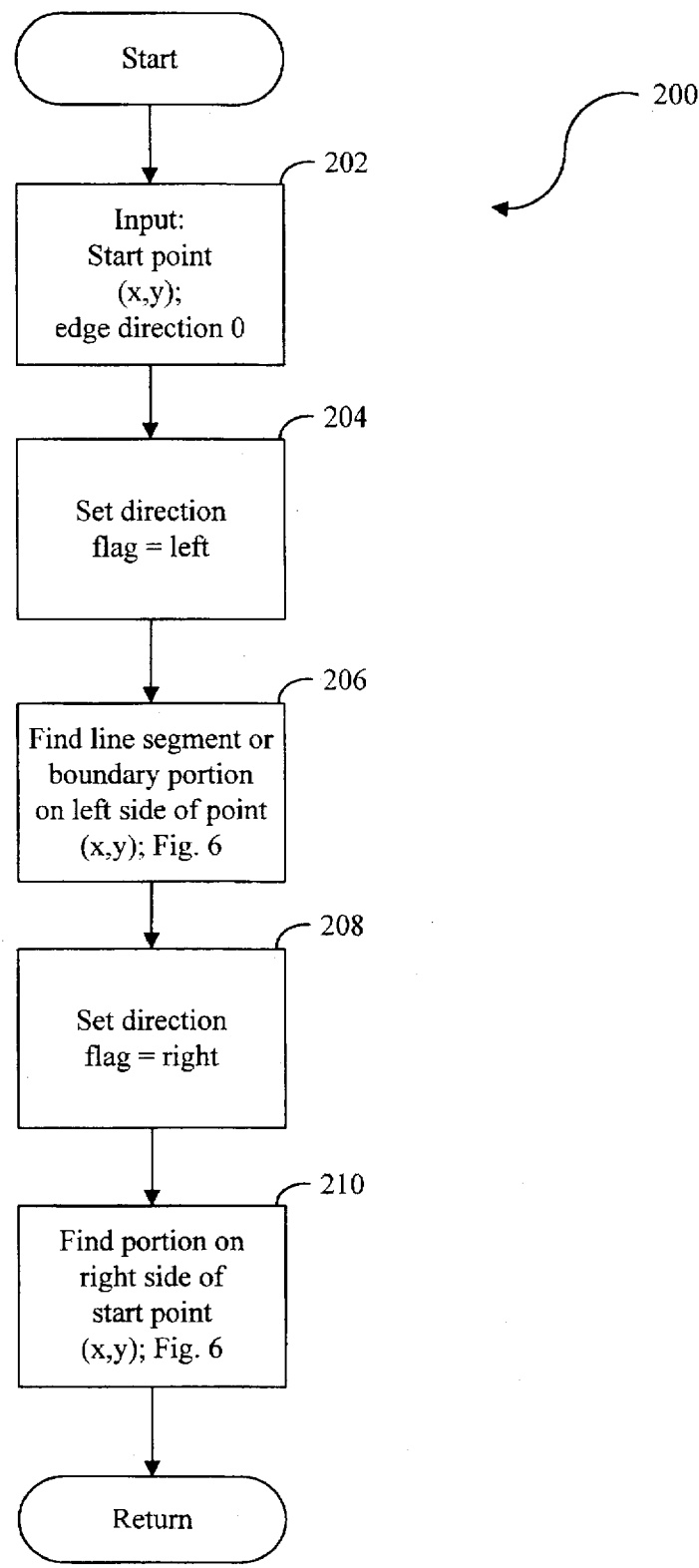
FIG. 5 is a flow chart of a subroutine for locating a line on opposite sides of a starting point.

In step 104, the processor invokes a subroutine 200 that defines or locates a line segment that extends along the located edge, and which includes the edge point (X,Y). Referring to FIG. 5, an exemplary line segment locating routine 200 begins in step 202 by inputting the edge point (X,Y) and a gradient or edge direction $\theta$. The gradient or edge direction refers to the distance of greatest change in pixel intensity from a given pixel with respect to the edge direction at that pixel or point. In the present invention, the edge direction angle $\theta$ at a given point is generally perpendicular to the edge of a boundary or other feature in the symbol 53 at that point. In step 204, the processor 60 sets a directional flag to a value of left with respect to the Cartesian coordinate system.

Figure 6:
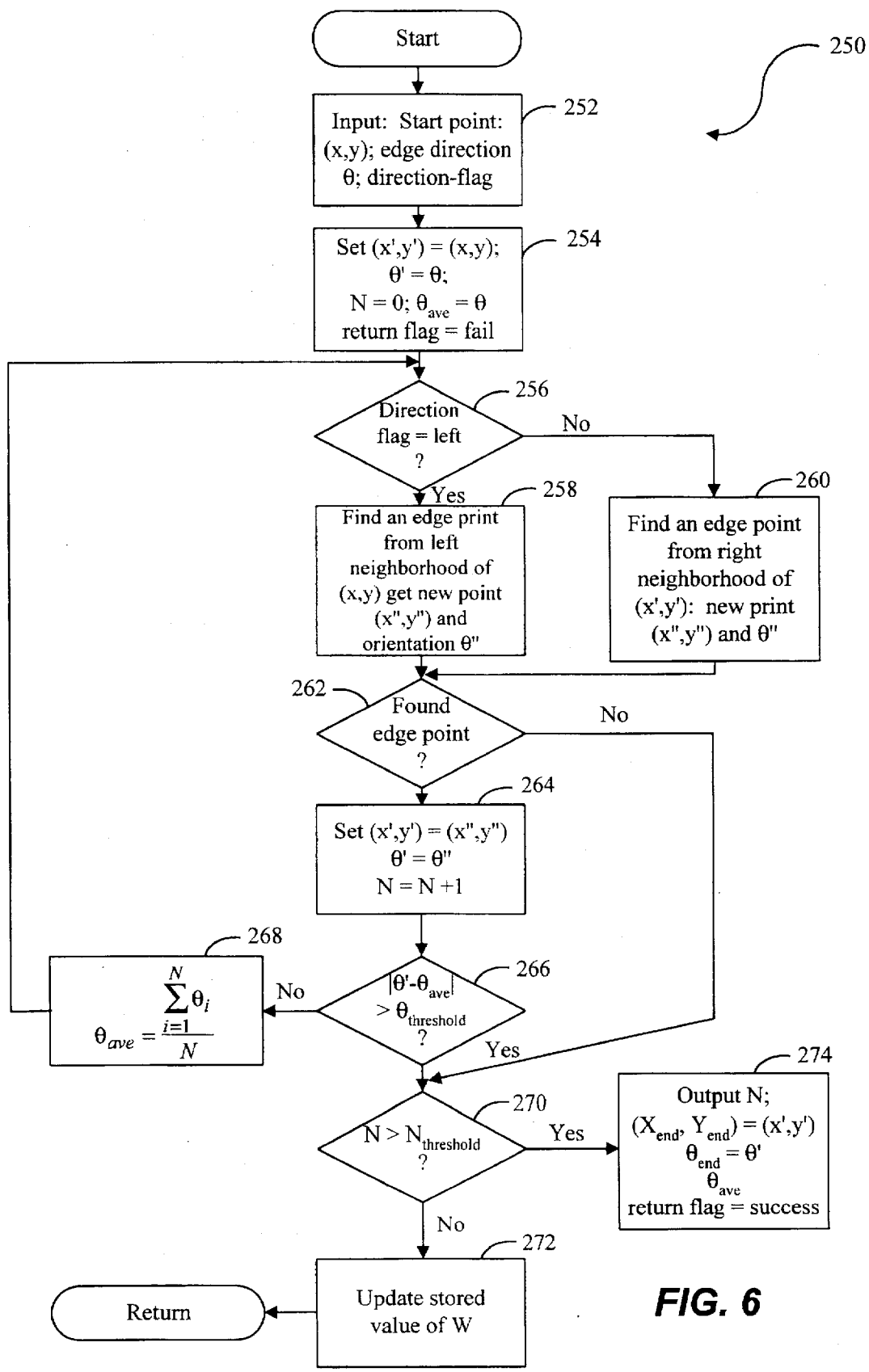
FIG. 6 is a flow chart of a subroutine for locating a line segment from one side of a starting point.

In step 206, the processor 60 invokes a subroutine 250 that finds a line segment beginning at the edge point (X,Y) and extending leftward along the edge. Referring to FIG. 6, the edge finding subroutine 250 begins in step 252 by inputting a starting point (the edge point (X,Y)), the edge direction $\theta$, and the value of the directional flag. In step 254, the processor 60 sets an initial point variable (X',Y') to the edge point (X,Y), and an initial directional variable $\theta'$ to the edge direction $\theta$. In step 254 the processor 60 also sets a variable N to 0 and an average edge direction $\theta_{AVE}$ to the value of $\theta$. Finally, in step 254, the processor 60 sets a return flag to a value of failure.

In step 256, the processor 60 determines whether the directional flag has a left value. If so, then in step 258, the processor 60 finds an edge point in a neighborhood to the left of the point (X',Y'), to locate a new edge point (X",Y"), and a new edge direction $\theta"$ for the new edge point. A "neighborhood" refers to a cluster or group of pixels such as a 3×3 square group of pixels.

Alternatively, if in step 256 the processor 60 determines that the directional flag is not set to a left value, then in step 260, the processor 60 finds a point in a neighborhood to the right of the point (X',Y') as a new edge point (X",Y") and a new directional orientation $\theta"$. After step 258 or 260, the processor 60 in step 262 determines whether an edge point has been found. If so, then in step 264, the processor 60 sets the initial point (X',Y') to the newly located edge point (X",Y"). Additionally, the processor 60 in step 264 sets the initial directional variable θ' to the new edge direction θ" at the new edge point, and increments the value N by 1.

In step 266, the processor 60 determines whether the absolute value of the difference between the directional variable θ' and the average directional value $\theta_{AVE}$ is greater than a threshold directional value $\theta_{THRESHOLD}$. If it is not, then in step 268, the processor 60 updates the average directional value $\theta_{AVE}$ by adding all previous directional values θ' and dividing the sum by the current value for the variable N. Thereafter, the routine 250 loops back to step 256. Under steps 258 (or 260), 262, 264, 266 and 268, the processor 60 analyzes the stored image and travels along one of the solid boundaries 70 or 72, or a portion of the boundary, by essentially sampling pixel after pixel of the stored image in the direction θ' for an edge point of the boundary positioned adjacent to the quiet zone.

Figure 7:
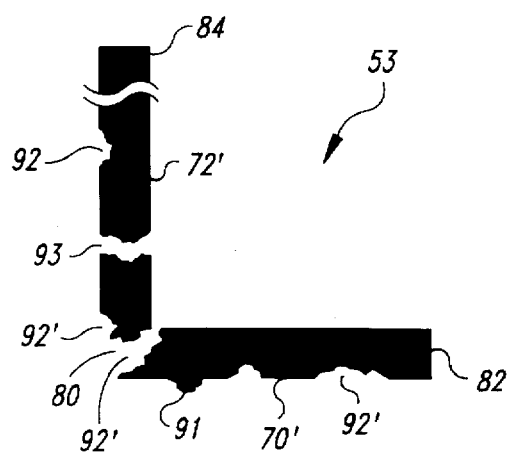
FIG. 7 is an enlarged view of distorted and/or damaged solid boundaries for the finder pattern of a Data Matrix symbol.

The symbol 53 can have damaged boundaries, such as the damaged solid boundaries 70' and 72' shown in FIG. 7. As shown in FIG. 7, the finder pattern can include printing or imaging defects that cause one or more boundaries to have a larger than average width portion 91. As is known, the solid boundaries, as well as individual data cells, have a width equal to the X-dimension. The X-dimension typically represents the smallest width (or height) of the bars, spaces, data cells or other features in a given symbology. The symbol 53 can also include other damage or defects, such as voids 92 that cause the solid boundaries 70' or 72' to have a width less than the X-dimension. Additionally, the boundaries can also include gaps 93 so that the boundaries are discontinuous, and may also be fragmentary. Finally, the symbol 53 can include missing corners, such as a void 92'. The routines under the present invention preferably locate the solid and dashed boundaries of the finder pattern for the symbol 53 despite such defects, voids and gaps in the boundaries. Therefore, in step 266, the processor 60 determines whether the difference between the new directional variable θ' and the average directional value $\theta_{AVE}$ is so great as to exceed the threshold direction $\theta_{THRESHOLD}$ to indicate that either a corner has been reached (such as the corners 80, 82 or 84) or that the boundary is discontinuous and has ended due to some gap 93. The constant $\theta_{THRESHOLD}$ preferably has a value of between 5° and 15°.

If the current directional value θ' differs from the average so that it is greater than the threshold direction $\theta_{THRESHOLD}$ in step 266, or if the edge point has not been found in step 262, then in step 270 the processor 60 determines whether the constant N is greater than a threshold value $N_{THRESHOLD}$. The constant $N_{THRESHOLD}$ is a minimum number of times that a processor 60 loops through the steps 258 (or 260), 262, 264, 266 and 268 before determining that a line segment has been accurately located. For example, the constant $N_{THRESHOLD}$ can be as small as a number of 3 to 5, indicating that a line segment of only 3 to 5 pixels is necessary to identify a line segment. However, the present invention preferably employs a value N in the subroutine 250 of between 6 and 15, depending on such factors as the resolution of the reader 60, the size of the symbol 53 being imaged, etc.

If the processor 60 has performed the steps 258 (or 260), 262, 264, 266 and 268 for a number of iterations less than the value of $N_{THRESHOLD}$, then in step 272, the processor 60 updates a stored value of an estimated X-dimension or width W. Thereafter, the processor 60 returns with a return flag still set at the fail value established in step 254 to the routine or subroutine which called the subroutine 250 (i.e., returns to the subroutine 200 of FIG. 5). However, if the processor has sufficiently performed the series of steps in the routine 250 so that the value of N is greater than the constant value of $N_{THRESHOLD}$ in step 270, then in step 274, the processor 60 stores or outputs the current value of N, sets an end point $(X_{END}, Y_{END})$ as equal to the current point located under steps of 250, i.e., (X',Y'). Additionally, the processor 60 in step 274 establishes an end directional value $\theta_{END}$ as equal to the current directional value θ'. Finally, the processor in step 274 also stores or provides the current average directional value $\theta_{AVE}$ and changes the return flag to a success value. Thereafter, in step 272, the processor 60 updates the stored value of W, and then returns back to the routine or subroutine which called the subroutine 250 (i.e., returns to subroutine 200).

Under step 272, the processor 60 invokes an element crossing subroutine 300 to estimate the X-dimension W. The subroutine 300 essentially samples the end point $(X_{END}, Y_{END})$ in the gradient direction θ to determine the width of the boundary or edge at that point. As shown in FIG. 3, only at the corner points 82 and 84 are the solid boundaries 70 and 72 one X-dimension wide. At other points along the solid boundaries 70 and 72, one or more data cells can be adjacent to the boundary so that the width in the gradient direction can be two times the X-dimension or more.

Figure 8:
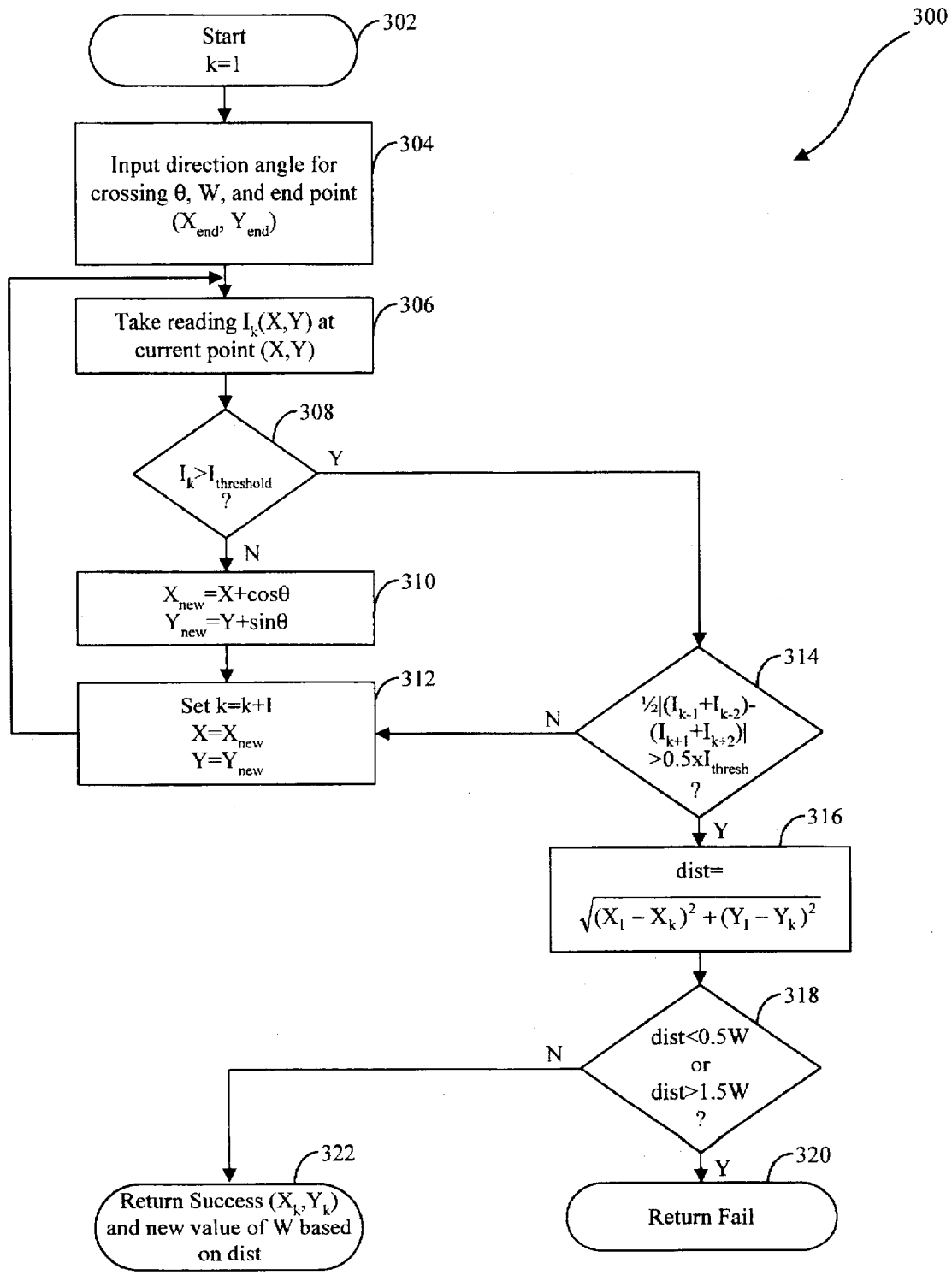
FIG. 8 is a flow chart of a subroutine for crossing an element.

Referring to FIG. 8, in step 302 of the element crossing subroutine 300, the processor 60 initializes a value k to one, where k represents the number of samplings. The processor 60 in step 304 recalls the gradient direction θ and the estimated X-dimension W from memory, as well as a starting point (X,Y), which for the exemplary symbol 53 of FIG. 3 is the corner point 82. If the starting point is at the end of a solid boundary, then the processor 60 chooses a starting point that is one-half of the X-dimension (½ W) backward along the boundary (e.g., leftward). Next, in step 306, the processor 60 takes and stores an intensity reading $I_k(X,Y)$ at the current point (X,Y), and in step 308, the processor compares $I_k(X,Y)$ with a threshold intensity value $I_{THRESHOLD}$. If the current intensity reading $I_k(X,Y)$ does not exceed the threshold intensity, then the processor 60 determines that the element has not yet been crossed and proceeds to step 310. For example, if the pixel intensity values range from 1 to 16, with the low values indicating a black element, then the processor 60 in step 308 determines whether the current intensity value for the current pixel is less than approximately a midway value in the range, e.g., less than a value of 8.

In step 310 the processor 60 establishes a new point having new X- and Y-axis coordinates as $X_{NEW}=X+\cos\theta$ and $Y_{NEW}=Y+\sin\theta$. Then, in step 312, the processor 60 sets the value $X=X_{NEW}$, the value $Y=Y_{NEW}$, and increments k by one. The processor 60 loops back to step 306, moves to the new sampling point $I_k(X,Y)$, and continues. In this way, the processor 60 travels through an end portion of the first solid boundary 70.

However, if in step 308 the processor 60 determines that the intensity reading $I_k(X,Y)$ exceeds the threshold intensity, and that there is a possibility that the element has been crossed, then the processor proceeds to step 314. In step 314 the processor 60 checks intensity levels at two previously stored points and at two points following the current intensity $I_k(X,Y)$, and compares these values to one half of the threshold intensity as follows:

$$\frac{1}{2}|(I_{k-1}+I_{k-2})-(I_{k+1}+I_{k+2})|>0.5\,I_{THRESHOLD}. \quad (1)$$

This extra step assists in determining if the element has actually been crossed, or if some anomaly has been encountered. If the difference in intensities before and after the current point does not exceed one half of the threshold intensity, then the monitored point is merely an anomaly due to reflection, damage to the symbol 53, a printing error, etc. The processor 60 then calculates coordinates $X_{NEW}$ and $Y_{NEW}$ as well as increments the value of k in step 312, as described above, and returns to step 306 in the subroutine 300.

However, if the difference in intensities is greater than one half of the threshold intensity, then it is likely that the solid boundary 70 has been crossed. Thus, the processor 60 proceeds to step 316 to determine the distance of the point of crossing from the initial starting point by using the distance formula:

$$\text{dist} = \sqrt{(X_i - X_k)^2 + (Y_i - Y_k)^2} \qquad (2)$$

Finally, the processor 60 proceeds to step 318, where it compares the calculated distance (dist) with the estimated X-dimension of the symbol W. If the distance is either less than 50% of the estimated X-dimension or more than 150% of the estimated X-dimension, then the processor 60 determines that the calculated size of the solid boundary 70 is too small or large to be correct, and it proceeds to step 320 where it returns to the routine or subroutine which invoked the current subroutine 300, and indicates that the attempt to cross the element has failed. If, however, the distance falls between 50% and 150% of the estimated X-dimension, then the processor 60 proceeds to step 322 and returns to the routine 200 or the subroutine which called the subroutine 300. Additionally, in step 322, the processor 60 returns the new value of W based on the newly determined distance dist.

Returning to step 272 in FIG. 6, the processor 60 updates the stored value of the estimated X-dimension W with the newly receive value of W. For example, the processor 60 can average the current value of the estimated X-dimension W with the distance dist to provide a more accurate estimation of the X-dimension. As a result, the processor 60 is able to estimate the X-dimension for the symbol 53, despite distortions, such as the perspective optical distortions shown in FIG. 4 where the X-dimension at the corner 82 is much greater than the X-dimension at the corner 84. The processor 60 can also employ other methods for estimating the X-dimension of the symbol 53, approximately modified for use herein, such as the inventor's copending application, Orientation Independent Method for Robust Computing of X-Dimensions in Code 1 Symbols, application Ser. No. 08/524,368, filed Sep. 6, 1995.

Referring back to FIG. 5, in step 208, the processor 60 sets the directional flag to a right value. Thereafter, in step 210, the processor 60 finds a line segment on the right side of the start point (X,Y). The processor 60 again invokes the edge finding subroutine 250 of FIG. 6, except that the directional flag input in step 252 has a right value. After again performing the subroutine 250, the processor 60 ends the subroutine 200, and returns to the main routine 100 of FIG. 2.

In step 106, the processor 60 in the main routine 100 determines whether one of the boundaries, or portion of the boundaries 70 or 72 has been located under the subroutine 200 by analyzing the data returned to the main routine, such as the value of the return flag of the line segment locating subroutine 250 (FIG. 6). If a line segment has not been found, then the routine 100 ends. The reader 50 provides an audible and/or visual failure indication to the user, indicating to the user that he or she must reimage the symbol 53. After reimaging the symbol 53, the processor 60 performs the routine 100 again in a second attempt to decode the symbol. Alternatively, as described herein, the routine 100 could attempt to locate the image of the symbol 53 within the stored image by looping to subsequent steps in the routine, attempting to locate other important features of the finder pattern, such as opposing corners, partial or complete dashed boundaries 74 or 76, etc. and thereby estimate the outer boundaries of the symbol. However, to balance locating and decoding speed versus complexity of the locating algorithm, the processor 60 in step 106 assumes that the symbol 53 is too badly damaged to quickly provide an accurate estimation of the boundaries of the symbol. Therefore, the routine 100 ends in step 106 if no partial boundary is located.

Figure 9:
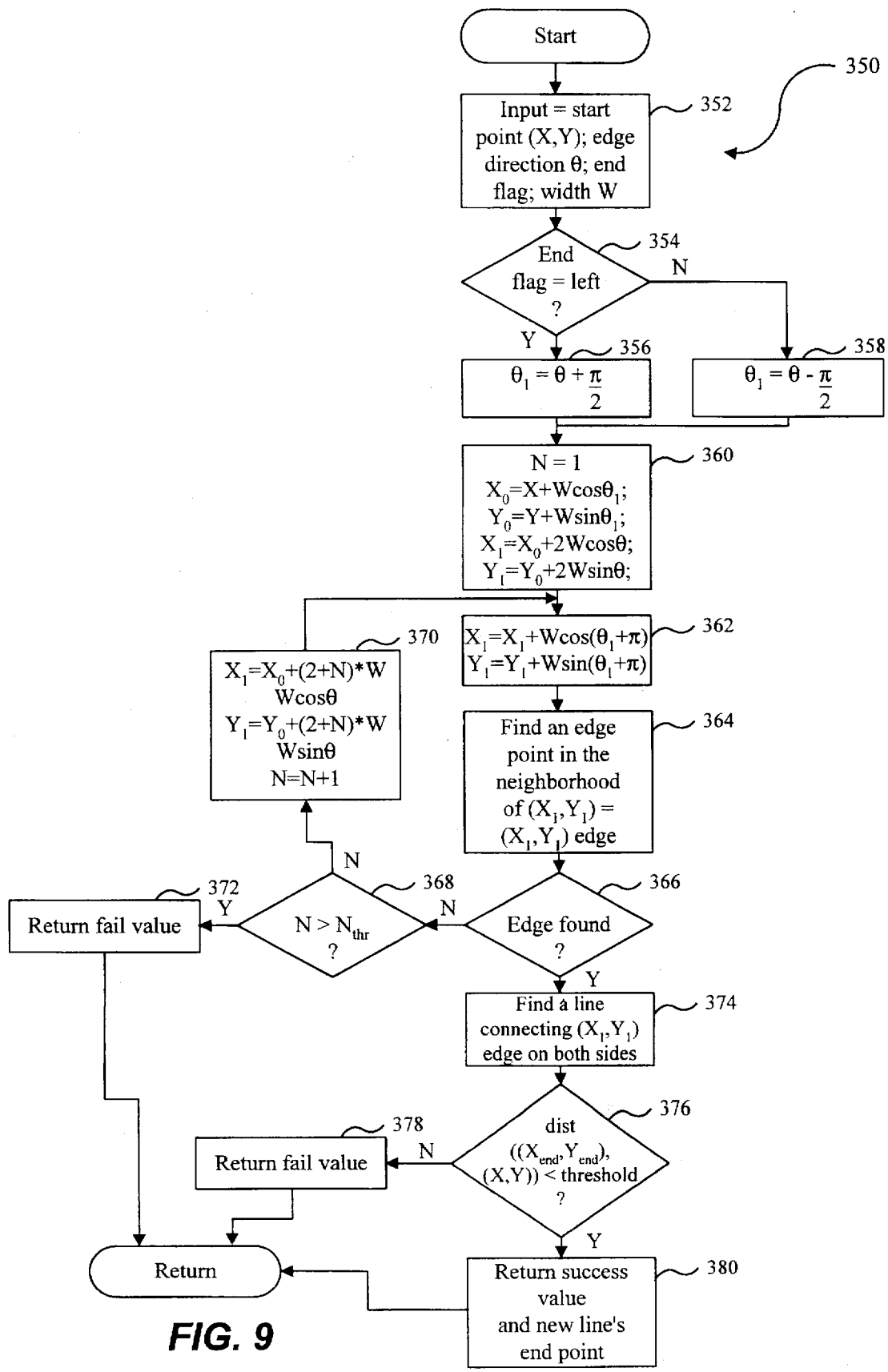
FIG. 9 is a flow chart of a subroutine for finding a solid corner for a finder pattern of a Data Matrix symbol.

If the processor 60 determines in step 106 that one of the boundaries 70 or 72 has been located, then in step 108, the processor 60 attempts to find the solid corner 80 at the left end of the located line. Therefore, in step 108, the processor 60 calls a corner finding subroutine 350. Referring to FIG. 9, the corner finding subroutine 350 begins in step 352 by inputting a starting point (X,Y), the edge direction θ, a value for the end flag, and the estimated X-dimension or width W. The starting point (X,Y) is the end point previously located at the left end of the located line under step 206 (FIG. 5), while the edge direction θ is the gradient direction corresponding to that end point. The end flag is set to a value of left in step 108 (FIG. 2), while the width W was determined in step 272 (FIG. 6).

In step 354, the processor 60 determines whether the end flag has a left value. If it does, then in step 356, a directional variable $θ_1$ is set at a value of the edge direction θ plus 90° or π/2. Alternatively, if the directional flag is not set to a value of left (i.e., right), then in step 358, the processor 60 sets the directional variable $θ_1$ to a value of θ minus 90° or π/2. In step 360, the processor 60 sets a counter value N to a value of 1. The processor 60 also analyzes the stored image and moves or "jumps" one width value W to the left and two width values W upward from the starting point. In other words, the processor 60 initially jumps leftward to a point $(X_0, Y_0)$, which has the value of:

$$X_0 = X + W \cos θ_1, \text{ and} \qquad (3)$$

$$Y_0 = Y + W \sin θ_1. \qquad (4)$$

The processor 60 jumps a distance of two times the width W upward thereafter to a point $(X_1, Y_1)$, which has the value of:

$$X_1 = X_0 + 2W \cos θ, \text{ and} \qquad (5)$$

$$Y_1 = Y_0 + 2W \sin θ. \qquad (6)$$

In step 362, the processor 60 then moves or jumps a distance equal to M rightward to a new point $(X_1, Y_1)$, which has the value of:

$$X_1 = X_1 + W \cos (θ_1 + π), \text{ and} \qquad (7)$$

$$Y_1 = Y_1 + W \sin (θ_1 + π). \qquad (8)$$

In step 364, the processor 60 finds an edge point in the neighborhood of the new point $(X_1, Y_1)$ to locate a new edge point $(X_1, Y_1)_{EDGE}$. As explained herein, the processor preferably analyzes a 3-pixel by 3-pixel square area to locate a transition from black to white pixels within that neighborhood.

In step 366, the processor 60 determines whether an edge point has been found. If it is not, then in step 368, the processor 60 determines whether the counter value N is greater than a threshold value $N_{THR}$. If the counter value N is not greater than the threshold value $N_{THR}$, then in step 370, the processor 60 increments the value of N by 1 and establishes a new point several pixels upward from the upper point $(X_1,Y_1)$ established in step 360. In other words, the processor 60 in step 370 jumps to a new upper point $(X_1,Y_1)$, which has the following value:

$$X_1 = X_0 + (2+N) * W \cos \theta, \text{ and} \quad (9)$$

$$Y_1 = Y_0 + (2+N) * W \sin \theta. \quad (10)$$

In this way, if the corner 80 is damaged, such as shown by the damaged corner 92' in FIG. 7, the processor 60 establishes a new point upward in step 372 in an attempt to move beyond the damaged corner to a point at the end of the second solid boundary 72. Thereafter, the processor 60 repeats steps 362, 364, 366, 368 and 372 as the processor moves incrementally upward until either an edge is found in step 366, or the counter value N is greater than the threshold value $N_{THR}$.

The value $N_{THR}$ indicates the number of times that the processor 60 has looped through the steps 362, 364, 366, 368 and 372. After a specified number of iterations of these steps, e.g., $N_{THR}=5$, then during the sixth iteration, the value N is greater than the threshold value $N_{THR}$, indicating that the corner 80 is too badly damaged, or that the processor 60 is analyzing an image in the stored image that is similar to, but is not the symbol 53. Therefore, in step 372, the processor 60 returns a fail value to the main routine 100, and the corner finding subroutine 350 ends.

Assuming an edge point has been found in 366, then in step 374, the processor 60 finds a line extending from the edge point $(X_1,Y_1)_{EDGE}$ on both sides, and locate the end points of the located line. Therefore, the processor 60 in step 374 invokes the line locating subroutine 200 of FIG. 5. After locating the line and end points under the subroutine 200, the processor 60 in step 376 determines whether the end point $(X_{END},Y_{END})$ located to the right of the line located in step 374 is close to the starting point (X,Y), which is the end point located at the left of the line determined in step 104 (FIG. 2). The processor 60, in step 376, determines the distance under equation (2) between the end point $(X_{END}, Y_{END})$ and the start point (X,Y), and then determines whether the distance is less than a threshold value. The threshold value can be within one-half to two times the estimated X-dimension, and can be a value such as one times the value W. If the determined distance is not less than the threshold, then in step 378, the processor 60 returns a failed value to the main routine 100, indicating that the corner 80 has not been found. However, if the determined distance is less than the threshold, then in step 380, the processor 60 returns a success value, and the end points of the line determined in step 374.

Figure 10:
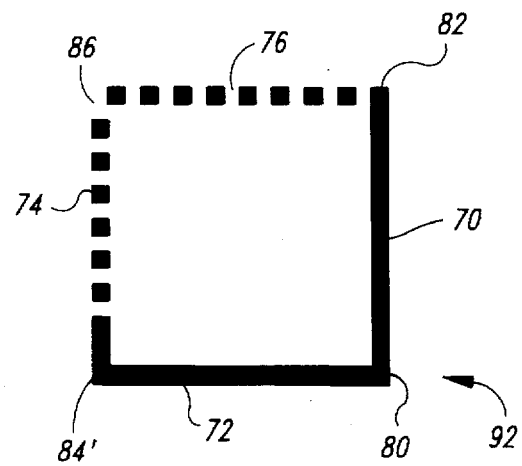
FIG. 10 is a schematic diagram of a Data Matrix symbol having a false solid corner.

Referring back to FIG. 2, in step 110, the processor 60 determines whether a corner has been located under the corner finding routine 350 of FIG. 9. If not, then the processor 60 in step 112 sets the directional flag to a right value and attempts to find the solid corner 80 at the right end of the line determined in step 106. For example, the symbol 53 shown in FIG. 3 could be rotated 90° counterclockwise in the stored image (as shown in FIG. 10), such that the line determined in step 104 is the solid boundary 72 (rather than the solid boundary 70). Therefore, the solid corner 80 exists to the right of the located boundary 72. After performing the corner finding subroutine 350 of FIG. 9, the subroutine returns back to the main routine 100 in FIG. 2, and the processor 60 determines at step 114 whether the corner 80 has been located. If not, then the routine 100 jumps to a step 132 to locate the dashed boundaries 74 and 76, ignoring the solid corner 80, as explained below. However, as explained above, the routine 100 can alternatively continue with the remaining steps of the routine in an attempt to still estimate the boundaries of a badly damaged or distorted symbol.

If the processor 60 determines in step 110, or in step 114, that the corner 80 has been located, then in step 116, the processor 60 attempts to locate the solid boundary adjoining the located corner. For example, if the first solid boundary 70 was initially located in step 104, then in step 116, the processor 60 attempts to locate the solid boundary 72. Therefore, in step 116, the processor 60 invokes the line segment locating routine 250 of FIG. 6, with a starting point being the corner point previously located, and the directional flag set to a value of up, assuming the symbol 53 is oriented as shown in FIG. 3. The subroutine 50 is appropriately modified to reflect the new direction, as would be understood by those skilled in the relevant art.

After attempting to locate the second boundary under the subroutine 250, the processor 60 in step 118 of FIG. 2 determines whether the second solid boundary 72 has been found. If not, then in step 120, the processor 60 invokes the corner finding subroutine 350 to attempt to find the solid corner 80 at the opposite end of the line determined in step 104. Referring to FIG. 10, a symbol 92 is shown which is similar to the symbol 53 of FIG. 3, except that it is rotated 90° counterclockwise. Additionally, a printing defect at the corner 84 causes an end of the dashed boundary 74 to bleed into and be connected with the end point of the second solid boundary 72 to form a false solid corner 84'. As a result, the false corner 84' can be mistaken as the solid corner 80 in step 108. However, the processor fails to locate the second solid boundary in step 116. Therefore, if the processor 60 in step 118 determines that the second boundary does not exist, then in step 120, the processor 60 attempts to locate the solid corner at the opposite end of the line initially located in step 104.

Consequently, in step 120, the processor 60 invokes the corner finding subroutine 350 of FIG. 9 to attempt to locate the solid corner 80 at the opposite end of the line 72 for the symbol 92 of FIG. 10. In step 122, the processor 60 determines whether the solid corner 80 has been located. If not, then the routine ends. Alternatively, as noted above, the routine 100 could nevertheless continue and attempt to locate the boundaries of the symbol. If the processor 60 in step 122 determines that the corner 80 has been located, then in step 124, the processor attempts to find the second solid boundary (i.e., the boundary 70) extending from the located solid corner 80 by invoking the line segment locating subroutine 250 of FIG. 6. Thereafter, in step 126 of FIG. 2, the processor 60 determines whether the second solid boundary has been located in step 124, and if not, the routine 100 ends. If the second solid boundary has been located in steps 126 or 118, the processor 60 in step 128 attempts to find a first dashed boundary extending from the free end of the second solid boundary (extending from the corner opposite to the solid corner 80).

Figure 11:
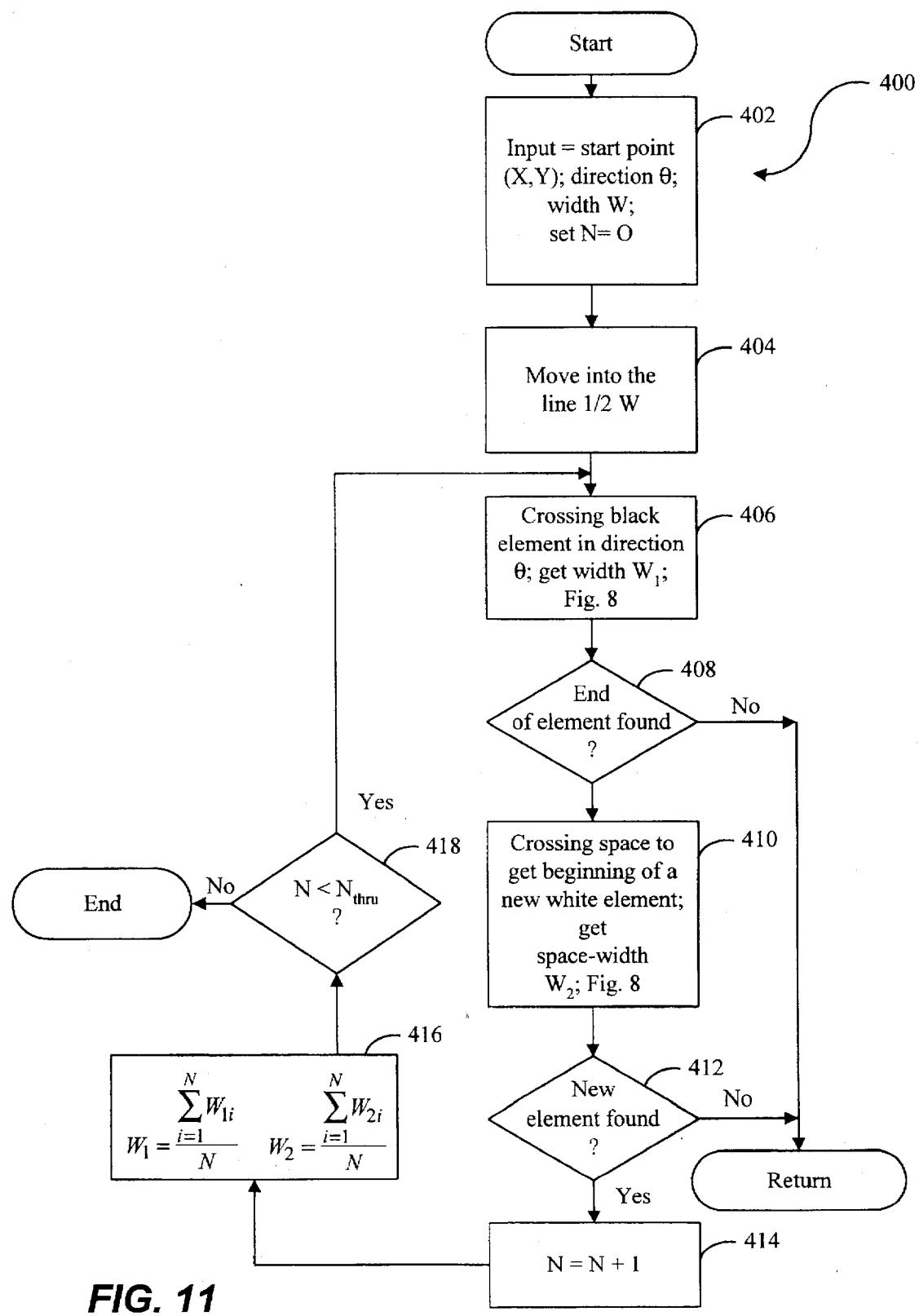
FIG. 11 is a flow chart of a subroutine for finding dashed boundaries for a finder pattern of a Data Matrix symbol.

Referring to FIG. 11, the processor 60 in a dashed line locating subroutine 400 begins in step 402 by inputting a start point (X,Y), a direction θ, a width W, and sets a counter value N to 0. The starting point (X,Y) is the end point of the solid boundary, such as the end point 84 of the second solid boundary 72. The direction θ is the gradient direction, e.g., which is perpendicular to the direction of the solid boundary 72, and should be parallel to the direction of the dashed line 74. In step 404, the processor 60 moves inward on the solid boundary with respect to the starting point (X,Y). For example, if the starting point (X,Y) is the corner point 84 of the second solid boundary 72, then the processor 60 moves downward in step 404 a distance equal to one-half the X dimension or one-half W. Thereafter, in step 406, the processor 60 crosses the solid boundary 72 in the direction θ and computes a new value for the width W under the element crossing subroutine 300 of FIG. 8 discussed above.

In step 408, the processor 60 determines whether the end of the solid boundary (or black element under later iterations) has been located. The processor 60 compares the distance dist determined under step 316 of the subroutine 300 to a pair of distance thresholds. A first distance threshold can be two times an estimated X-dimension W for elements (i.e., 2 * $W_1$), while the second distance threshold can be ½ times the estimated block X-dimension W. As is known, due to printing defects, optical distortions, etc., the X-dimension of black or dark elements in a given symbol can be larger or smaller than the X-dimension of white or light elements in the same symbol, even though ideally they should be equal. The processor 60 in step 408 determines whether the determined distance dist lies between the first and second distance thresholds based on the following equation:

$$\tfrac{1}{2} * W_1 < W \leq 2 * W_1 \quad (11)$$

If the processor in step 408 determines that the determined distance dist is greater than the first threshold 2 * W, indicating either a large printing defect or sampling into the data cells for the symbol 53, or less than the second threshold ½ * W, then the subroutine 400 ends. However, if the determined distance dist is between the thresholds, then in step 410, the processor 60 crosses the white element adjacent to the solid boundary 72. The processor 60 in step 410 again invokes the element crossing subroutine 300 of FIG. 8. Subroutine 300 of FIG. 8, however, is slightly modified to compensate for the crossing of a white, rather than a black, element, as will be evident to those skilled in the relevant art. For example, the processor 60 in step 308 determines whether the current pixel intensity threshold is less than the threshold intensity $I_{THRESHOLD}$.

Thereafter, in step 412 of FIG. 11, the processor 60 determines whether the end of the white element has been found. The processor 60 compares the distance of the white element dist determined under the subroutine 300 to a similar pair of thresholds. If the determined width distance W is greater than one-half the estimated X-dimension $W_2$, but less than two times the estimated white X-dimension $W_2$, based on the following equation, then the processor 60 determines that the white element has been properly crossed:

$$\tfrac{1}{2} * W_2 < W \leq 2 * W_2 \quad (12)$$

Therefore, the processor 60 proceeds to step 414 where it increments the value N by 1. Otherwise, if the estimated distance lies outside of the thresholds, the processor 60 returns a failed value and ends the subroutine 400.

Following step 414, the processor 60 in step 416 averages the estimated black and white X-dimensions $W_1$ and $W_2$ under the following equations:

$$W_1 = \frac{\sum_{i=1}^{N} W_{1_i}}{N} \quad (13)$$

$$W_2 = \frac{\sum_{i=1}^{N} W_{2_i}}{N} \quad (14)$$

The averaged, estimated black and white X-dimensions $W_1$ and $W_2$ are then later used during subsequent iterations of the steps 406, 408, 410, 412 and 414, as explained below.

Figure 12:
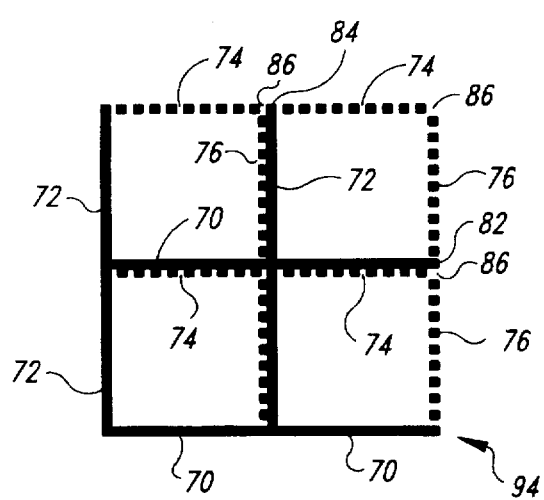
FIG. 12 is a schematic diagram of a large Data Matrix symbol having multiple, adjacent finder patterns.

Thereafter, in step 418, the processor 60 determines whether the counter value N is greater than a threshold value $N_{THRE}$. The threshold value $N_{THRE}$ preferably has a value of 72, which represents a maximum number of iterations through the steps 406, 408, 410, 412, 414 and 416. Referring to FIG. 12, a symbol 94 shows a larger Data Matrix symbol essentially consisting of four symbols similar to the symbol 53 of FIG. 3. Under the data matrix symbology, multiple symbols may be adjoined in a square matrix, as shown in FIG. 12, to provide a single larger symbol. Currently, the maximum symbol size employs a single combined dashed boundary that has 72 white data cells (or 72 black data cells). Therefore, if in step 418 the processor 60 determines that the counter value N is greater than 72, then the processor is analyzing a damaged symbol or not analyzing a Data Matrix symbol, but some other information in the stored image. However, if the counter value N is less than the threshold value of $N_{THRE}$, then the routine loops back and performs the steps 406, 408, 410, 412, 414 and 416. Such steps are continually performed until the processor 60 no longer finds a black or white element in step 408 or 412, or exceeds the threshold value in step 418.

Referring back to FIG. 2, after the processor 60 has located the first dashed boundary in step 128, such as the dashed boundary 74, the processor 60 in step 130 determines whether the dashed boundary has been located. If it has not, then the symbol could have a damaged corner 84 (or corner 82), which inhibits the processor 60 from locating the dashed boundary under the subroutine 400. Therefore, in step 132, the processor 60 locates the opposite end of the first solid boundary previously determined in step 104, e.g., the boundary 72. Alternatively, if the processor 60 determined in step 114 that the solid corner 80 was not found, then the routine 100 proceeds to the step 132.

Thereafter, in step 134, the processor 60 attempts to find the other dashed boundary connected to the located opposite end of the solid boundary by employing the dashed boundary locating subroutine 400 of FIG. 11. For example, if the corner 84 is badly damaged, then the processor 60 employs the subroutine 400 to locate the dashed boundary 76 extending from the corner 82 of the solid boundary 70 for the symbol 53 (FIG. 3). In step 136, the processor 60 then determines whether the subroutine 400 has located the dashed boundary (e.g., the dashed boundary 76). If not, the routine 100 ends. However, if the routine 400 has located one of the dashed boundaries in step 136 or in step 130, then the processor 60 finds the other dashed boundary.

Initially, the processor 60 in step 138 invokes the subroutine 400 and attempts to find the dashed boundary extending perpendicularly from the first located dashed boundary, e.g., finds the dashed boundary 76 if the dashed boundary 74 had previously been located in step 128 for the symbol 53 (FIG. 3). The processor 60 begins at the corner 86, and travels leftward to the corner 84 under the subroutine 400 as it locates the dashed boundary 74. In step 140, the processor 60 determines whether the second dashed boundary has been located. If not, then in step 142, the processor 60 locates the opposite end of the first solid boundary, if the processor located the first dashed boundary in step 128. For example, the corner 86, at which the dashed boundaries 74 and 76 meet, can be badly damaged or distorted, so that the processor 60 cannot locate the dashed boundary extending perpendicular from the first located dashed boundary. Therefore, in step 144, the processor 60 attempts to locate the dashed boundary connected to the located opposite end point under the dashed boundary locating subroutine 400. For example, if the processor 60 located a first dashed boundary 74 in step 128, but failed to locate the dashed boundary 76, extending perpendicularly therefrom, in step 138, the processor 60 attempts to locate the dashed boundary 76 by beginning at the corner 82 and travelling along the dashed boundary 76 upward therefrom, under the subroutine 400. In step 146, the processor 60 determines whether the subroutine 400 has located the second dashed boundary. If not, the routine 100 ends.

If the routine 200 has located the second dashed boundary in step 146 or step 140, the processor 60 determines in step 147 whether the processor had failed to locate the solid corner 80 in step 114. If so, then in step 147, the processor 60 locates the second solid boundary. The processor 60 essentially performs the subroutine 250, beginning at the end point of the second located dashed boundary, to locate the as yet unlocated solid boundary. For example, if the processor 60 failed to locate the corner 80, but had located the solid boundary 70, and dashed boundaries 76 and 74, the processor 60 in step 147 would employ the subroutine 250, beginning at the corner 84, to locate the solid boundary 72.

Thereafter, in step 148, the processor 60 examines the corner 86 at which the dashed boundaries 74 and 76 meet to determine a version for the symbol. The processor 60 determines whether the dashed boundaries 74 and 76 end at approximately the same Cartesian coordinates, or within one estimated X-dimension W of the coordinates. If the dashed boundaries end at approximately the same corner point, i.e., at a black element, then the processor 60 knows that the symbol is a version ECC 140 symbol (e.g., such as the symbol 90 of FIG. 4). However, if the distance between the two corner points is approximately the square root of two times the estimated X-dimension, then the processor 60 determines that the first and second dashed boundaries 74 and 76 end in a white element, as shown in FIG. 3. If so, then the processor 60 determines that the symbol 53 is a version ECC 200 Data Matrix symbol. If the processor 60 determines that the corner 86 is damaged (e.g., by failing to locate the second dashed boundary in step 138), then the processor analyzes the two dashed boundaries 74 and 76 to estimate the version for the symbol.

In step 150, the processor 60 selects the appropriate decoding routine and decodes the located image of the symbol 53. Since the processor 60 knows the version of the Data Matrix symbol from the previous step 148, the processor 60 can select the appropriate decode routine. The decoding routines are well-known in the art. If necessary, the processor 60 in step 150 can perform known linear fitting routines to fit lines through the located portions of the solid boundaries 70 and 72, and dashed boundaries 74 and 76, and/or the corner points 80, 82, 84 and 86, to define a periphery or bounding box for the symbol 53. If a corner, or portion of a boundary were missing, the linear fitting techniques could accurately estimate the outer boundaries of the symbol to facilitate the locating of the data cells within the symbol. Linear fitting techniques are known in the art and would be particularly advantageous with a badly distorted symbol, such as the symbol 90 of FIG. 4. The present invention can be adapted based on the detailed description herein, to use known linear fitting and boundary box estimating routines, such as the inventor's copending applications, Method and Apparatus for Locating Data Regions in Stored Images of Symbols, application Ser. No. 08/571,257, filed Dec. 11, 1995, and Method and Apparatus for Accurately Locating Data Regions in Stored Images of Symbols, application Ser. No. 08/607,100, filed Feb. 26, 1996. All cited U.S. patents and applications are incorporated herein by reference, as if set forth in their entirety.

Although specific embodiments of, and examples for, the present invention have been described for purposes of illustration, various modifications may be made without departing from the spirit and scope of the invention, as will be known by those skilled in the relevant art. The teachings provided herein of the present invention may be applied to other machine vision systems, not necessarily machine-readable symbol readers. For example, while the present invention has been generally described above as locating the center finder pattern of a Data Matrix symbol, the present invention can be applied to machine vision systems that require locating similar linear, dashed and "L-shaped" patterns. The present invention can be readily used in computer systems with robotic arms for locating the edges of square, rectangular or other polygonally shaped objects in various environments, e.g., in an automated assembly environment.

Additionally, while the routine 100 ends after failing to locate certain portions of the finder pattern, such as portions of certain boundaries, the routine can nevertheless proceed after failing to locate the particular feature, even though such a routine can become more complex, and therefore slower, than the routine generally described herein. These and other changes may be made to the invention in light of the above detailed description. In general, in the following claims, the terms used should not be construed to limit the invention to the specific embodiment disclosed in the specification and the claims, but should be construed to include any locating routine that operates in accordance with the claims to locate features or symbols, such as Data Matrix symbols. Terms such as locating a feature, should generally be construed to include any method or structure for automatically recognizing a distinguishing mark such as a line or boundary printed on an object or line forming a recognizable part of the object. Accordingly, the invention is not limited by the disclosure, but instead its scope is to be determined entirely from the following claims.

I claim:

1. A method of locating an image of a machine-readable symbol within a stored image, the machine-readable symbol having a recognition pattern that includes first and second solid linear features meeting at a common corner, and having first and second dashed linear features extending from free ends of the first and second solid features, the method comprising the steps of:

locating an edge point of one of the first and second solid features;

locating at least a portion of one of the first and second solid features based on the located edge point;

locating at least a portion of another of the first and second solid features based on the located portion of the one solid feature;

locating at least a portion of the first dashed feature based on the located portion of the first or second solid feature;

locating at least a portion of the second dashed feature based on the located portion of the second solid feature or first dashed feature; and locating a position of the symbol in the stored image based on the located portions of the first and second solid and dashed features.

2. The method of claim 1 wherein the step of locating at least a portion of one of the first and second solid features includes the steps of:

locating a new edge point of the first solid feature extending from a first side of the located edge point;

determining if an edge direction at the new edge point has a predetermined relationship with a threshold directional value; and repeating the steps of locating a new edge point and determining until the edge direction has the predetermined relationship with the threshold directional value.

3. The method of claim 1 wherein the step of locating at least a portion of one of the first and second solid features locates an edge of the first solid feature extending from opposite sides of the located edge point.

4. The method of claim 1, further comprising the steps of:

locating a first end point of the first solid feature;

moving to a location in the stored image that is a predetermined distance away from the end point;

locating a new edge point of the second solid feature, proximate to at the location;

determining a line extending from the new edge point and along the second solid feature, the line including a second end point proximate to the first end point;

determining whether a distance between the first and second end points has a predetermined relationship to a threshold value; and determining the common corner based on the first and second end points.

5. The method of claim 1, further comprising the step of locating the common corner, based on the located portion of the first solid feature, and wherein the step of locating at least a portion of another locates a portion of the second solid feature based on the located common corner.

6. The method of claim 1 wherein the first and second dashed features meet at a dashed corner, and wherein the method further comprises the steps of:

locating the dashed corner, and determining a version of the symbol based on the located dashed corner.

7. The method of claim 1 wherein the first and second dashed features include dark and light alternating elements, and wherein the step of locating the first dashed feature includes the steps of:

(a) beginning at the free end of the first or second solid feature;

(b) crossing a dark element;

(c) determining a width of the dark element;

(d) determining if the width of the dark element is acceptable based on a dark width value;

(e) crossing a light element;

(f) determining a width of the light element;

(g) determining if the width of the light element is acceptable based on a light width value;

(h) updating the dark and light width values based on the determined widths of the dark and light elements; and (i) repeating the steps of (b) through (h) until the first dashed feature is located.

8. The method of claim 7 wherein the step of locating the second dashed feature includes the steps of:

beginning at a free end of the first dashed feature, and repeating the steps of (b) through (h) in a direction toward the free end of the second or first solid feature until the second dashed feature is located.

9. The method of claim 7 wherein the step of locating the second dashed feature includes the steps of:

beginning at the free end of the second or first solid feature; and repeating the steps of (b) through (h) in a direction substantially perpendicular to the second or first solid feature until the second dashed feature is located.

10. The method of claim 7 wherein the step of crossing the dark element includes the steps of:

taking a reading of an intensity at a present position;

comparing the intensity against a threshold intensity;

incrementally advancing the position along a crossing direction until an intensity at a current portion exceeds the threshold intensity; and designating the current portion where the threshold intensity was exceeded as an end of the dark element.

11. The method of claim 1 wherein the first dashed feature includes several linearly positioned dark elements, and wherein the steps of locating the first dashed feature includes the steps of:

(a) beginning at the free end of the first solid feature;

(b) crossing a dark element;

(c) moving to a beginning of a next dark element in the several linearly positioned dark elements; and (d) repeating the steps of (b) and (c) until the first dashed feature is located.

12. The method of claim 1 wherein the machine-readable symbol is a Data Matrix symbol, and wherein the method further comprises the steps of:

determining a version of the Data Matrix symbol based on the located first and second dashed features; and decoding the Data Matrix symbol based on the determined version.

13. A method of locating a predetermined image within a stored image, the predetermined image having first and second linear features and first and second dashed linear features adjacent to the first and second linear features, the method comprising the steps of:

locating an edge point of one of the first and second linear features;

locating at least a portion of one of the first and second linear features based on the located edge point;

locating at least a portion of another of the first and second linear features;

locating at least a portion of the first dashed feature based on the located portion of the first or second linear feature;

locating the second dashed feature based on the located portion of the first dashed feature or first solid feature; and locating a position of the predetermined image in the stored image based on the located portions of the first and second linear and dashed features.

14. The method of claim 13 wherein the step of locating at least a portion of one of the first and second linear features includes the steps of:

locating a new edge point of the first solid feature extending from a first side of the located edge point;

determining if an edge direction at the new edge point has a predetermined relationship with a threshold directional value; and repeating the steps of locating a new edge point and determining until the edge direction has the predetermined relationship with the threshold directional value.

15. The method of claim 13 wherein the step of locating at least a portion of one of the first and second linear features locates an edge of the first solid feature extending from opposite sides of the located edge point.

16. The method of claim 13, wherein the first and second linear features meet at a common corner, and wherein the method further comprises the steps of:

locating a first end point of the first solid feature;

moving to a location in the stored image that is a predetermined distance away from the end point;

locating a new edge point of the second solid feature, proximate to at the location;

determining a line extending from the new edge point and along the second solid feature, the line including a second end point proximate to the first end point;

determining whether a distance between the first and second end points has a predetermined relationship to a threshold value; and determining the common corner based on the first and second end points.

17. The method of claim 16, further comprising the step of locating the common corner, based on the located portion of the first solid feature, and wherein the step of locating at least a portion of another locates a portion of the second solid feature based on the located common corner.

18. The method of claim 13 wherein the first and second dashed features include dark and light alternating elements, and wherein the steps of locating the first and second dashed features includes the steps of:

(a) beginning at a free end of the first solid feature;

(b) crossing a dark element;

(c) determining a width of the dark element;

(d) determining if the width of the dark element is acceptable based on a dark width value;

(e) crossing a light element;

(f) determining a width of the light element;

(g) determining if the width of the light element is acceptable based on a light width value;

(h) updating the dark and light width values based on the determined widths of the dark and light elements; and (i) repeating the steps of (b) through (h) until the first dashed feature is located.

19. The method of claim 18 wherein the step of locating the second dashed feature includes the steps of:

beginning at a free end of the first dashed feature, and repeating the steps of (b) through (h) in a direction toward the free end of the second or first linear feature until the second dashed feature is located.

20. The method of claim 18 wherein the step of locating the second dashed feature includes the steps of:

beginning at a free end of the second or first linear feature; and repeating the steps of (b) through (h) until the second dashed feature is located.

21. The method of claim 18, wherein the step of crossing the dark element includes the steps of:

taking a reading of an intensity at a present position;

comparing the intensity against a threshold intensity;

incrementally advancing the position along a crossing direction until an intensity at a current portion exceeds the threshold intensity; and designating the current portion where the threshold intensity was exceeded as an end of the dark element.

22. The method of claim 13 wherein the first dashed feature includes several linearly positioned dark elements, and wherein the steps of locating the first dashed feature includes the steps of:

(a) beginning at a free end of the first solid feature;

(b) crossing a dark element;

(c) moving to a beginning of a next dark element in the several linearly positioned dark elements; and (d) repeating the steps of (b) and (c) until the first dashed feature is located.

23. A method of locating an image of a machine-readable symbol within a stored image, the symbol having a predetermined pattern at a periphery of the symbol, the predetermined pattern having first and second solid linear features meeting at a common solid corner, and having first and second dashed linear features extending from free ends of the first and second solid features and meeting at a common dashed corner, the method comprising the steps of:

finding an edge point of the predetermined pattern;

analyzing at least a portion of the periphery of the symbol;

locating, based on the step of analyzing, at least portions of the predetermined pattern, the located portions being one of (a) solid and dashed corners, (b) at least a portion of the first and second solid and dashed features, (c) at least a portion of the first and second dashed features and the solid corner, (d) at least a portion of the first and second solid features and the dashed corner, and (e) at least complete locations of three of the four features; and determining a position of the symbol in the stored imaged based on the located portions of the predetermined pattern.

24. The method of claim 23 wherein the step of locating includes the steps of:

locating a new edge point of the first solid feature extending from a first side of the located edge point;

determining if an edge direction at the new edge point has a predetermined relationship with a threshold directional value; and repeating the steps of locating a new edge point and determining until the edge direction has the predetermined relationship with the threshold directional value.

25. The method of claim 23 wherein the step of locating locates an edge of the first solid feature extending from opposite sides of the located edge point, and locates the solid corner at one end of the located edge of the first solid feature.

26. The method of claim 23 wherein the step of locating includes the steps of:

locating a first end point of the first solid feature;

moving to a location in the stored image that is a predetermined distance away from the end point;

locating a new edge point of the second solid feature, proximate to at the location;

determining a line extending from the new edge point and along the second solid feature, the line including a second end point proximate to the first end point;

determining whether a distance between the first and second end points has a predetermined relationship to a threshold value; and locating the solid corner point as the second end point if the distance between the first and second end points has the predetermined relationship to the threshold value.

27. The method of claim 23 wherein the first dashed feature includes several linearly positioned dark elements, and wherein the steps of locating includes the steps of:

(a) beginning at the free end of the first solid feature;

(b) crossing a dark element;

(c) moving to a beginning of a next dark element in the several linearly positioned dark elements; and (d) repeating the steps of (b) and (c) until the first dashed feature is located.

28. The method of claim 23 wherein the machine-readable symbol is a Data Matrix symbol, wherein the step of locating locates either the dashed corner or the first and second dashed features in their entirety, and wherein the method further comprises the steps of:

determining a version of the Data Matrix symbol based on the located dashed corner or first and second dashed features; and decoding the Data Matrix symbol based on the determined version.

29. An apparatus for locating an image of a predetermined pattern within a stored image, the predetermined pattern having first and second solid linear features meeting at a common corner, and having first and second dashed linear features extending from free ends of the first and second solid features, the apparatus comprising:

a sensor that receives light reflected from the predetermined pattern and produces an output signal therefrom;

a receiver that receives the output signal and produces a data signal indicative of at least portions of the predetermined pattern;

a memory for storing the data signal that represents at least portions of the predetermined pattern; and a processor for locating the predetermined pattern in the memory, the processor being programmed to (a) locate an edge point of one of the first and second solid features, (b) locate at least a portion of one of the first and second solid features based on the located edge point, (c) locate at least a portion of another of the first and second solid features, (d) locate the first and second dashed features based on the located first or second solid features, and (e) locate a position of the predetermined image in the memory based on the located first and second solid and dashed features.

30. The apparatus of claim 29 wherein the processor locates at least a portion of one of the first and second solid features by locating an edge of the first solid feature extending from opposite sides of the located edge point within the memory.

31. The apparatus of claim 29 wherein the processor locates the common corner point by (a) locating a first end point of the first solid feature, (b) moving to a location in the stored image that is a predetermined distance away from the end point, (c) locating a new edge point of the second solid feature, proximate to at the location, (d) determining a line extending from the new edge point and along the second solid feature, the line including a second end point proximate to the first end point, and (e) determining whether a distance between the first and second end points has a predetermined relationship to a threshold value.

32. The apparatus of claim 29 wherein the first dashed feature includes several linearly positioned dark elements, and wherein the processor locates the first dashed feature by (a) beginning at a free end of the first solid feature, (b) crossing a dark element, (c) moving to a beginning of a next dark element in the several linearly positioned dark elements, and (d) repeating the steps of (b) and (c) until the first dashed feature is located.

* * * * *